United States Patent
Gray

(10) Patent No.: US 10,300,964 B2
(45) Date of Patent: May 28, 2019

(54) VEHICLE TAILGATE

(71) Applicant: FORD MOTOR COMPANY, Dearborn, MI (US)

(72) Inventor: Jeffrey Gray, Dearborn, MI (US)

(73) Assignee: Ford Motor Company, Dearborn, MI (US)

(*) Notice: Subject to any disclaimer, the term of this patent is extended or adjusted under 35 U.S.C. 154(b) by 197 days.

(21) Appl. No.: 15/626,914

(22) Filed: Jun. 19, 2017

(65) Prior Publication Data

US 2018/0362097 A1    Dec. 20, 2018

(51) Int. Cl.
B62D 33/027    (2006.01)

(52) U.S. Cl.
CPC ................. B62D 33/0273 (2013.01)

(58) Field of Classification Search
CPC ......... B60J 10/86; B60J 10/87; B62D 33/027; B62D 33/023; B62D 33/03
See application file for complete search history.

(56) References Cited

U.S. PATENT DOCUMENTS

| | | | | |
|---|---|---|---|---|
| 4,865,154 A | * | 9/1989 | Hanson | F01N 1/02 181/282 |
| 5,687,538 A | * | 11/1997 | Frobosilo | E04B 5/10 52/100 |
| 5,944,373 A | | 8/1999 | Seksaria et al. | |
| 6,196,619 B1 | | 3/2001 | Townsend et al. | |
| 6,676,187 B1 | | 1/2004 | Miskech et al. | |
| 7,422,652 B2 | | 9/2008 | Ondrus et al. | |
| 8,998,298 B2 | * | 4/2015 | Gerwolls | F16F 7/128 188/377 |
| 2005/0269027 A1 | | 12/2005 | Ondrus et al. | |
| 2006/0124388 A1 | * | 6/2006 | Pompei | E04B 1/86 181/290 |
| 2015/0375804 A1 | | 12/2015 | Gray et al. | |

FOREIGN PATENT DOCUMENTS

| | | | | |
|---|---|---|---|---|
| JP | 57209440 A | * | 12/1982 | ........... B60R 13/105 |
| JP | 2012026433 A | * | 2/2012 | |
| KR | 20030066834 A | * | 8/2003 | |
| KR | 101448295 B1 | * | 10/2014 | |
| KR | 101506550 B1 | * | 3/2015 | |
| KR | 20150031816 A | * | 3/2015 | |

* cited by examiner

Primary Examiner — Hilary L Gutman
(74) Attorney, Agent, or Firm — Raymond Coppiellie; Brooks Kushman, P.C.

(57) ABSTRACT

A vehicle tailgate includes a laterally extending internal panel, laterally extending external panel, laterally extending support beam, and patches of anti-flutter adhesive. The laterally extending internal and external panels are spaced apart relative to each other. The laterally extending support beam is disposed between the internal and external panels, is secured to the internal panel, and has a plurality of spaced apart embossments that extend toward the external panel. The patches of anti-flutter adhesive are disposed between adjacent embossments and are secured to each of the support beam and external panel.

20 Claims, 4 Drawing Sheets

VEHICLE TAILGATE

TECHNICAL FIELD

The present disclosure relates to tailgate structures for vehicles such as automobiles and trucks.

BACKGROUND

Automobiles, including trucks, may include tailgates that provide access to storage areas such as truck beds.

SUMMARY

A vehicle tailgate includes a laterally extending internal panel, laterally extending external panel, laterally extending support beam, and patches of anti-flutter adhesive. The laterally extending internal and external panels are spaced apart relative to each other. The laterally extending support beam is disposed between the internal and external panels, is secured to the internal panel, and has a plurality of spaced apart embossments that extend toward the external panel. The patches of anti-flutter adhesive are disposed between adjacent embossments and are secured to each of the support beam and external panel.

A vehicle tailgate includes an internal panel, external panel, upper panel, lower panel, support member, and anti-flutter patches. The internal and external panels are each secured to the upper and lower panels. The internal, external, upper, and lower panels define a cavity therebetween. The support member is disposed within the cavity, is secured to the internal panel, and has a plurality of embossments that extend toward the external panel. The plurality of embossments do not span a gap defined between the support member and external panel. The anti-flutter patches are disposed between adjacent embossments and span the gap between the support member and external panel.

A vehicle includes a tailgate. The tailgate includes, internal and external panels, a support beam disposed within a space defined between the internal and external panels, spacers, and anti-flutter patches. The support beam is secured to the internal panel. The spacers are disposed between the support beam and external panel. The anti-flutter patches are disposed between adjacent spacers. The anti-flutter patches are also secured to each of and span a gap defined between the support beam and external panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
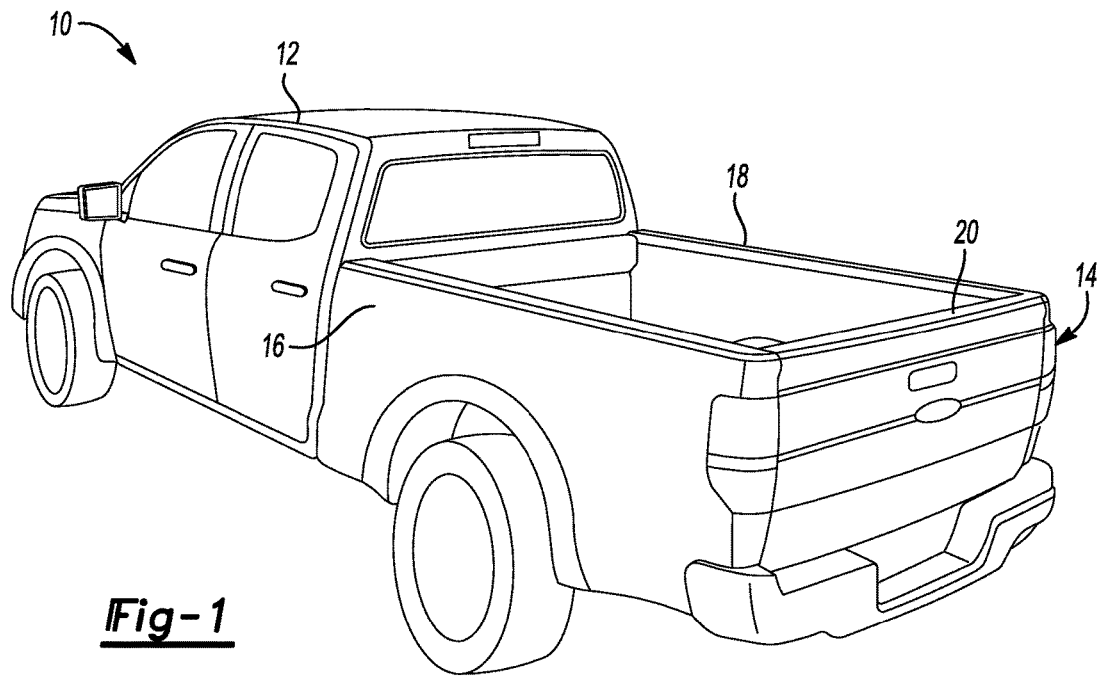
FIG. 1 is a perspective view of a vehicle, such as a truck, having a cargo or truck bed and a tailgate.

Referring to FIG. 1, a perspective view of vehicle 10 is illustrated. The illustrated vehicle 10 may be a truck. The vehicle 10 may include a body 12 (that includes a cabin space) and a cargo bed (or truck bed) 14. The body 12 and the cargo bed 14 may each be secured to a frame. The cargo bed 14 has a first side panel 16 and a second side panel 18 that extend upward from a floor panel. A tailgate 20 provides access to the cargo bed 14. The tailgate 20 may be rotatably secured to the cargo bed 14 proximate to the floor panel such that the tailgate is rotatable relative to the cargo bed 14 along an axis, which may be a horizontal or a horizontally extending axis, that extends laterally between the first side panel 16 and second side panel 18. The body 12 and cargo bed 14 may include various components of the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other by a welding process or by fasteners, such as rivets, screws, bolts, or any other type of faster known to a person of ordinary skill in the art.

Figure 2:
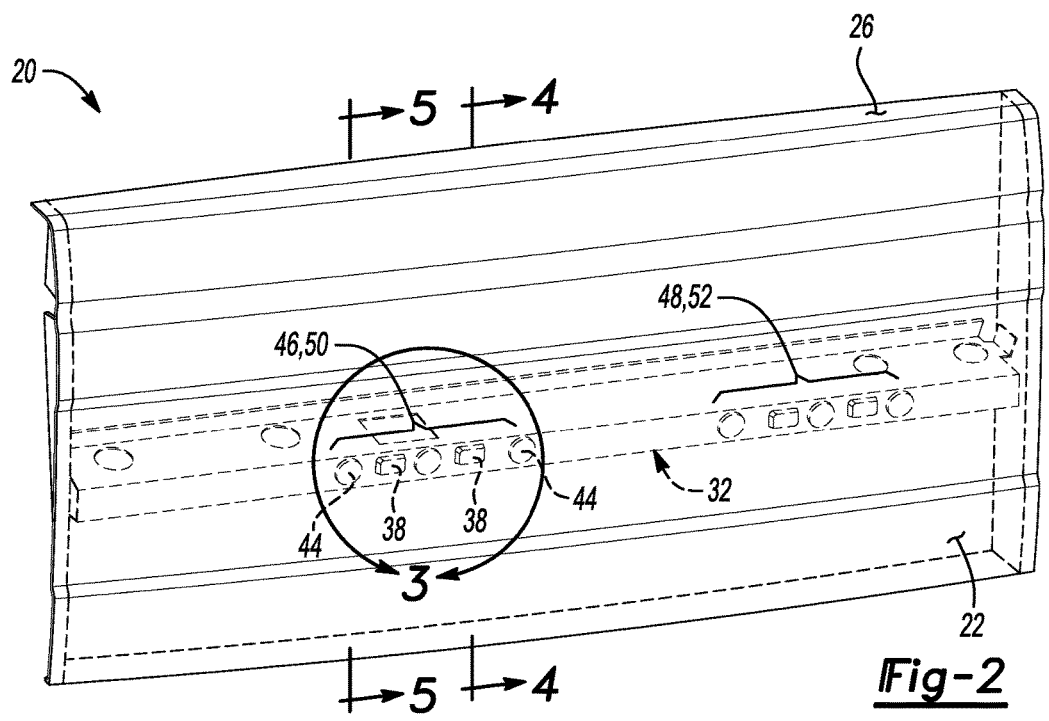
FIG. 2 is a perspective cut-away view of the tailgate.
Figure 3:
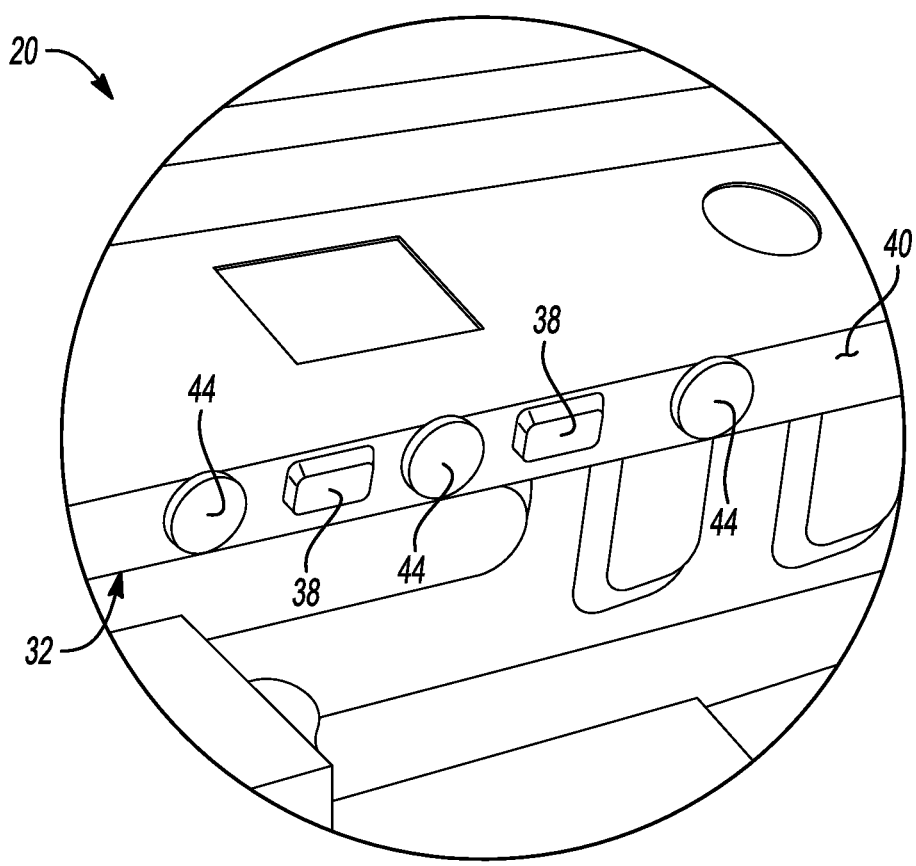
FIG. 3 is a magnified view of the area encompassed by boundary line 3 in FIG. 2.

Referring to FIGS. 2, 3, 4, and 5, a perspective cut-away view of the tailgate 20, a magnified view of the area encompassed by the boundary line 3 in FIG. 2, a cross-sectional view taken along line 4-4 in FIG. 2, and a cross-sectional view taken along line 5-5 in FIG. 2 are illustrated, respectively. The tailgate 20 includes an external panel 22, internal panel 24, upper panel 26, and lower panel 28. The external panel 22, internal panel 24, upper panel 26, and lower panel 28 may all extend laterally (or in a lateral direction) between the between the first side panel 16 and second side panel 18 when the tailgate is rotatably secured to the cargo bed 14. The external panel 22 and internal panel 24 are spaced apart relative to each other. The external panel 22 and internal panel 24 are each secured to the upper panel 26 and lower panel 28. A space or cavity 30 is defined between the external panel 22, internal panel 24, upper panel 26, and lower panel 28.

A support member or support beam 32 may be disposed within the cavity 30 between the external panel 22 and internal panel 24. The support beam 32 may also be disposed between the upper panel 26 and lower panel 28. The support beam 32 may also extend laterally (or in a lateral direction) between the between the first side panel 16 and second side panel 18 when the tailgate is rotatably secured to the cargo bed 14. The support beam 32 may be secured to the internal panel 24. The support beam 32 may include a pair of flanges 34 that are secured to the internal panel 24 and a central portion 36 that protrudes from the flanges 34 toward the external panel 22. More specifically, the central portion 36 may extend toward an internal surface 37 of the external panel 22. The support beam 32 may include a plurality of spaced apart embossments 38 that extend toward the external panel 22. An embossment may refer to a bulge or raised area that is formed in a sheet metal component. An embossment may be created by a stamping process. More specifically, the embossments 38 may extend from a flat outer surface 40 of the central portion 36 of the support beam 32 toward the internal surface 37 of the external panel 22. The embossment 38 may or may not span a gap 42 defined between the support beam 32 and the external panel 22.

Patches of anti-flutter adhesive or anti-flutter patches 44 may be disposed between adjacent embossments 38. An anti-flutter patch may be a small piece or area of anti-flutter material that is disposed between adjacent embossments. Alternatively, the anti-flutter material may be a ribbon that is disposed over an extended area. The anti-flutter patches 44 may be secured each of the support beam 32 and the external panel 22. More specifically, the anti-flutter patches 44 may be secured to the flat outer surface 40 of the central portion 36 of the support beam 32 and the internal surface 37 of the external panel 22. The anti-flutter patches 44 may also span the gap 42 defined between the support beam 32 and the external panel 22. The anti-flutter patches 44 may be elastic and/or have vibration absorbing properties to reduce any noise, vibration, or harshness issues that may be caused by the external panel 22.

The anti-flutter patches 44 may include a first set of three laterally aligned patches 46 disposed on a left-hand side of the support beam 32 and a second set of three laterally aligned patches 48 disposed on a right-hand side of the support beam 32. The embossments 38 may include a first set of two laterally aligned embossments 50 on the left-hand side of the support beam 32 and a second set of two laterally aligned embossments 52 disposed on a right-hand side of the support beam 32. Adjacent anti-flutter patches 44 of the first set of three laterally aligned patches 46 may be separated by a single embossment 38 that is included in the first set of two laterally aligned embossments 50. Adjacent anti-flutter patches 44 of the second set three of laterally aligned patches 48 may be separated by a single embossment 38 that is included in the second set of two laterally aligned embossments 52. Although first and second sets of three laterally aligned anti-flutter patches separated by first and second sets of two laterally aligned embossments are illustrated, the disclosure should not be construed as limited to such a configuration. The number anti-flutter patches and embossments may vary depending on various design parameters.

The external panel 22 may flex inward toward the support beam 32 during the paint bake cycle, phosphate washing process, e-coating process, automated assembly, automated transfer, manual handling, etc. The flexing of the external panel 22 inward may lead to over compression (or blow-out) and failure of the anti-flutter patches 44, such that the anti-flutter patches 44 are no longer capable of reducing or eliminating noise, vibration, or harshness issues. The anti-flutter patches 44 are made from a mastic viscous flowable material that is activated in the bake ovens of an assembly plant. Prior to heat activation, the anti-flutter patches 44 are vulnerable to over compression. The embossments 38 are effectively spacers between the support beam 32 and the external panel 22 that prevent the over compression and failure of the anti-flutter patches 44 during the paint bake cycle.

Figure 6:
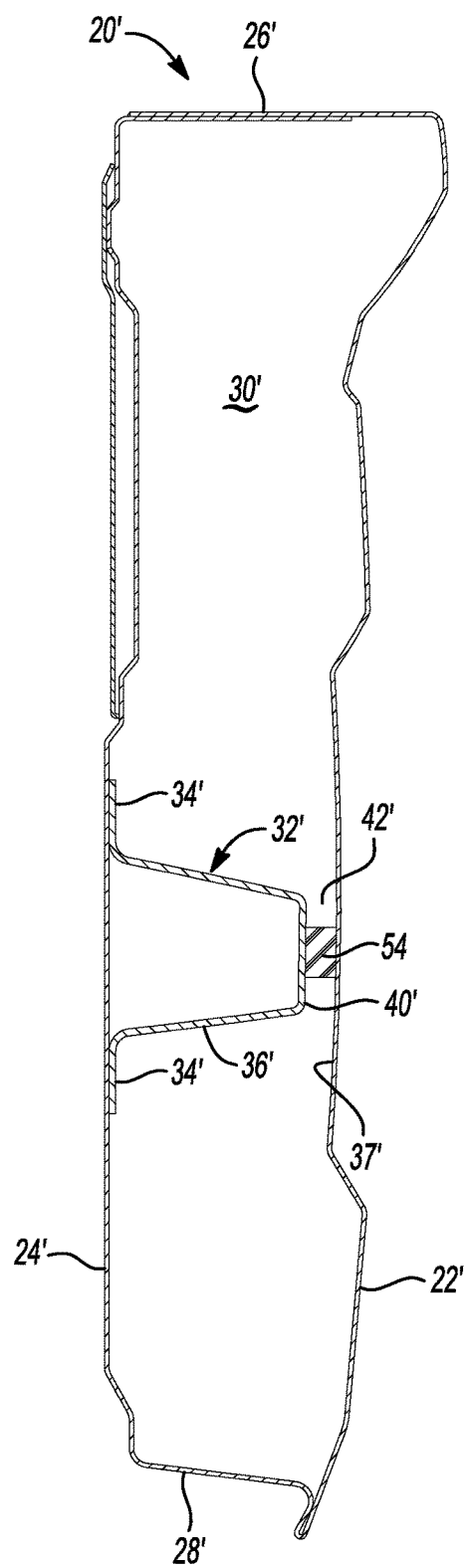
FIG. 6 is a cross-sectional view of an alternative embodiment of the tailgate.

Referring to FIG. 6 a cross-sectional view of an alternative embodiment of the tailgate 20' is illustrated. The alternative embodiment of the tailgate 20' should be construed to include all of the attributes of tailgate 20 unless specifically described otherwise herein. The tailgate 20' includes an external panel 22', internal panel 24', upper panel 26', and lower panel 28'. The tailgate 20' includes a support beam 32' disposed within a cavity 30' defined between the external panel 22', internal panel 24', upper panel 26', and lower panel 28'. The support beam 32' includes a pair of flanges 34' that are secured to the internal panel 24' and a central portion 36' that protrudes from the flanges 34' toward the external panel 22'. More specifically, the central portion 36' may extend toward an internal surface 37' of the external panel 22'.

Figure 4:
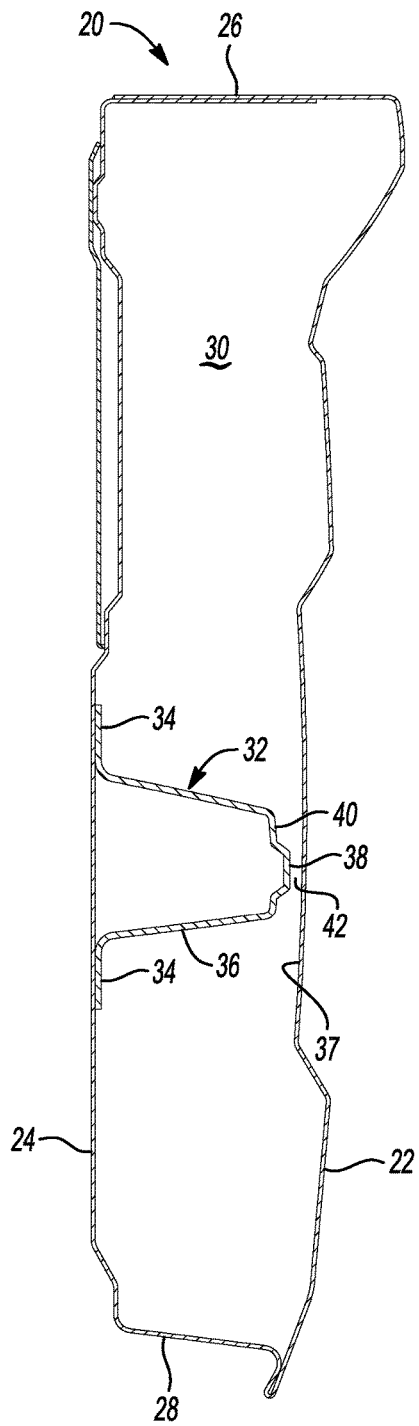
FIG. 4 is a cross-sectional view taken along line 4-4 in FIG. 2.
Figure 5:
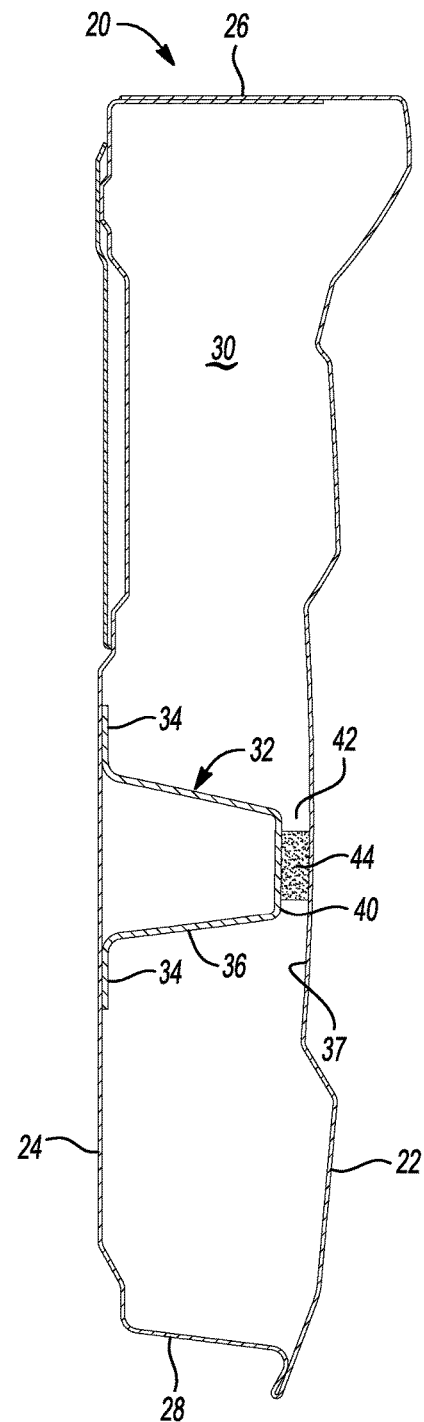
FIG. 5 is a cross-sectional view taken along line 5-5 in FIG. 2.

The cross-sectional view of FIG. 6 may be taken along a similar or corresponding position relative to tailgate 20' when compared to the cross-sectional view of FIG. 4 relative to tailgate 20. The difference between tailgate 20 and tailgate 20' is what is being utilized as a spacer between the support beam 32 and the external panel 22 to prevent failure or blow-out of the anti-flutter patches 44. As described above, tailgate 20 utilizes embossments 38 in the support beam 32 as spacers. Tailgate 20', however, utilizes elastic blocks 54 that are made from an elastic material, such as rubber, that is able to withstand more pressure than the anti-flutter patches 44 before plastic deformation occurs. The elastic blocks 54 prevent blow-out of the anti-flutter patches 44 in the same manner as the embossments 38 described above. The elastic blocks 54 may extend from a flat outer surface 40' of the central portion 36' of the support beam 32' toward the internal surface 37' of the external panel 22'. The elastic blocks 54 may or may not span a gap 42' defined between the support beam 32' and the external panel 22'. There should be at least one elastic block 54 disposed between the support beam 32' and the external panel 22' on each of the left-hand and right-hand sides of the of the support beam 32'. The configuration of the elastic blocks 54 relative to anti-flutter patches 44 may include any of the configurations described above regarding tailgate 20 with the elastic blocks 54 utilized in place of the embossments 38.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle tailgate comprising:
spaced apart laterally extending internal and external panels;
a laterally extending support beam disposed between the internal and external panels, secured to the internal panel, and having a plurality of spaced apart embossments extending toward the external panel; wherein the embossments do not span a gap defined between the support beam and external panel; and patches of anti-flutter adhesive disposed between adjacent embossments and secured to each of the support beam and external panel.

2. The tailgate of claim 1, wherein the support beam includes a pair of flanges that are secured to the internal panel and a central portion protruding from the flanges toward the external panel, wherein the central portion has a flat outer surface and the embossments extend from the flat outer surface toward the external panel.

3. The tailgate of claim 2, wherein the patches are secured to the flat outer surface of the support beam and an internal surface of the external panel.

4. The tailgate of claim 1, wherein the embossments extend toward the external panel.

5. The tailgate of claim 4, wherein the patches span the gap defined between the support beam and external panel.

6. The tailgate of claim 1, wherein the patches comprise a first set of three laterally aligned patches disposed on a left-hand side of the support beam and a second set of three laterally aligned patches disposed on a right-hand side of the support beam.

7. The tailgate of claim 6, wherein adjacent patches of the first set of three laterally aligned patches are separated by a first set of two laterally aligned embossments and adjacent patches of the second set of three laterally aligned patches are separated by a second set of two laterally aligned embossments.

8. A vehicle tailgate comprising:
internal and external panels each secured to upper and lower panels and defining a cavity therebetween;
a support member disposed within the cavity, secured to the internal panel, and having a plurality of embossments extending toward the external panel but not spanning a gap defined between the support member and external panel; and
anti-flutter patches disposed between adjacent embossments and spanning the gap between the support member and external panel.

9. The tailgate of claim 8, wherein the support member includes a pair of flanges that are secured to the internal panel and a central portion protruding from the flanges toward the external panel, wherein the central portion has a flat outer surface and the embossments extend from the flat outer surface toward the external panel.

10. The tailgate of claim 9, wherein the patches are secured to the flat outer surface of the support member and an internal surface of the external panel.

11. The tailgate of claim 8, wherein the patches comprise a first set of three laterally aligned patches disposed on a left-hand side of the support member and a second set of three laterally aligned patches disposed on a right-hand side of the support member.

12. The tailgate of claim 11, wherein adjacent patches of the first set of three laterally aligned patches are separated by a first set of two laterally aligned embossments and adjacent patches of the second set of three laterally aligned patches are separated by a second set of two laterally aligned embossments.

13. A vehicle comprising:
a tailgate including,
internal and external panels,
a support beam disposed within a space defined between the internal and external panels, secured to the internal panel,
spacers disposed between the support beam and external panel, and
anti-flutter patches disposed between adjacent spacers, the patches secured to each of and spanning a gap defined between the support beam and external panel, wherein the spacers do not span the gap defined between the support beam and external panel.

14. The vehicle of claim 13, wherein the support beam includes a pair of flanges that are secured to the internal panel and a central portion protruding from the flanges toward the external panel, wherein the central portion has a flat outer surface and the spacers extend from the flat outer surface toward the external panel.

15. The vehicle of claim 14, wherein the patches are secured to the flat outer surface of the support beam and an internal surface of the external panel.

16. The vehicle of claim 15, wherein the spacers are embossments that protrude from the flat outer surface and extend toward the external panel but do not span the gap defined between the support beam and external panel.

17. The vehicle of claim 15, wherein the spacers are elastic blocks that are secured to the flat outer surface and extend toward the external panel.

18. The vehicle of claim 13, wherein the patches comprise a first set of three laterally aligned patches disposed on a left-hand side of the support beam that are separated by a first set of two laterally aligned spacers and a second set of three laterally aligned patches disposed on a right-hand side of the support beam that are separated by a second set of two laterally aligned spacers.

19. The vehicle of claim 18, wherein the support beam includes a pair of flanges that are secured to the internal panel and a central portion protruding from the flanges toward the external panel, wherein the central portion has a flat outer surface and the spacers are elastic blocks that extend from the flat outer surface toward the external panel.

20. The vehicle of claim 18, wherein the spacers are embossments that protrude from the support beam and extend toward the external panel.

* * * * *